3,071,709
TRAVELING WAVE ELECTRICAL DISCHARGE DEVICE
Roy A. Paananen, Lexington, and David H. White, Medford, Mass., assignors to Raytheon Company, Lexington, Mass., a corporation of Delaware
Filed Feb. 10, 1960, Ser. No. 7,815
2 Claims. (Cl. 315—3.5)

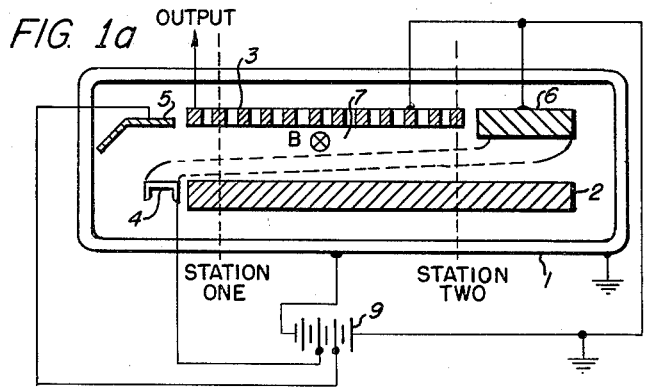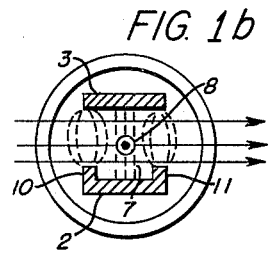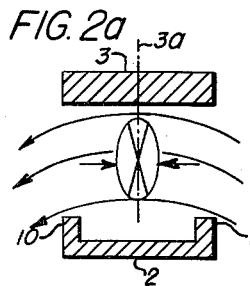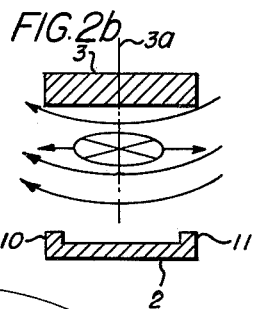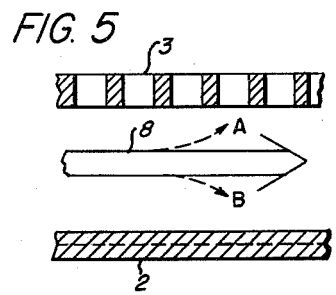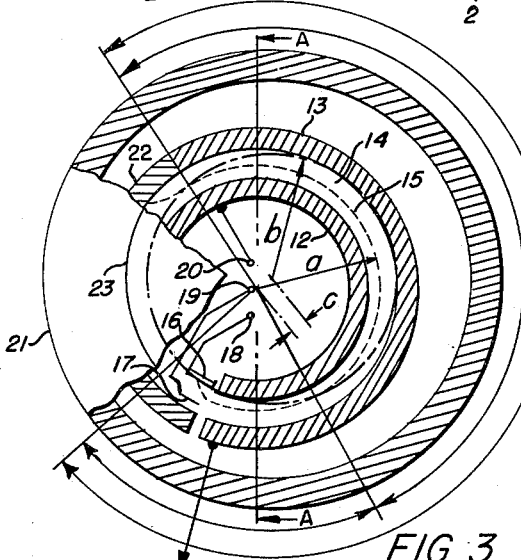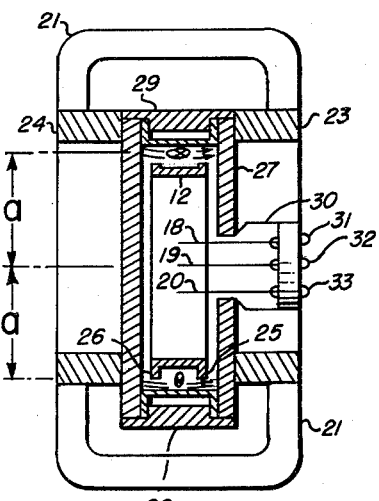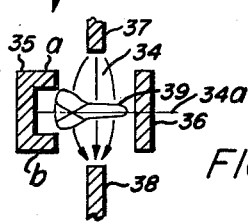
INVENTORS
ROY A. PAANANEN
DAVID H. WHITE
ATTORNEY United States Patent Office 3,071,709
Patented Jan. 1, 1963

This invention relates to traveling wave tubes and more particularly to a method and means of construction of a crossed field traveling wave tube oscillator, sometimes called an M-type backward wave oscillator.

In traveling wave tubes, electrical waves traveling along a slow wave structure in a tube interact with electrons moving along paths adjacent to said structure thereby amplifying the wave. The longitudinal component of the field of the wave interacts with electrons traveling along in approximate synchronism with the wave. Some electrons are accelerated and others are decelerated resulting in a progressive rearrangement in phase of electrons with respect to the waves. This process of mutual field interaction continues along the length of the tube with the net result that D.C. energy is given up by the electron beam to the wave as RF energy and, thus, the wave is amplified.

In one type of traveling wave tube, sometimes called a backward wave oscillator, radio frequency (RF) energy travels in a direction opposite to the general direction of travel of electrons in the beam. In the M-type backward wave oscillator, sometimes called a type M "carcinotron," the beam moves in crossed electric and magnetic fields, denoted E and B, respectively, in the interelectrode space between the slow wave structure, called the line, and an elongated electrode parallel to the line and called the sole electrode. The average translational velocity of the electrons is substantially proportional to $E/B$, and it is this velocity which establishes the oscillator frequency.

In the operation of such a tube, the beam enters the interelectrode space unbunched and then is quickly acted upon by the strong RF fields near the output of the delay line. A considerable portion of the entering electrons are phased such that the RF fields drive them towards the sole electrode, and these electrons extract energy from the RF wave. It would be desirable in such an oscillator to inhibit the energy extraction process by any possible means. Therefore, it is one object of the present invention to prevent the above-mentioned RF energy extraction by the beam.

For some applications it is desirable to frequency modulate an M-type backward wave oscillator without the expenditure of modulating energy. One method of accomplishing this would be to electrically insulate the delay line from other tube electrodes and to modulate the voltage applied thereto so as to modulate the electric field E while at the same time preventing electrons from being collected by the delay line. Therefore, it is another object of the present invention to prevent electrons from being collected by the delay line in an M-type backward wave oscillator.

It is another object to provide simple means for compelling electrons to move into or out of the strong RF fields in the vicinity of the delay line in a backward wave oscillator depending on whether the electrons are giving up energy to the RF wave or extracting energy therefrom.

It is another object to provide means for compelling electrons entering the interelectrode space to travel in the high RF field near the center plane of the delay line and to prevent said electrons from falling on the delay line at the other end of the interelectrode space.

It is a feature of the present invention to accomplish the above-mentioned objects by providing a suitably shaped magnetic field in a crossed field traveling wave tube to control the lateral positioning of beam electrons.

It is a feature of one embodiment of the present invention to provide such a magnetic field curved in one direction at one end of the interelectrode space and curved in another direction at the other end of the space thereby compelling electrons in a beam at said one end to travel in the high RF field near the center plane of the delay line and compelling electrons in the beam at the other end of said space to travel substantially outside said high RF field.

It is a feature of another embodiment to provide a magnetic field in said space bowed in one direction in the region adjacent the sole and bowed in an opposite direction in the region adjacent the delay line so that beam electrons which extract energy from the wave and, as a result, are driven into one bowing region are removed from the high RF field and beam electrons which give up energy to the wave and, as a result, are driven into the other bowing region are compelled to travel in said high RF field.

It it a further feature of embodiments of the present invention described herein to accomplish the above-mentioned magnetic field bowing by suitably shaping and/or locating magnetic bodies disposed immediately adjacent said interelectrode space.

Other features and objects of the present invention will be more apparent from the following specific description of embodiments of the present invention taken in conjunction with the drawings in which:

FIGS. 1a and 1b show, symbolically, a typical M-type backward wave oscillator including an interelectrode space with crossed D.C. electric and magnetic fields;

FIGS. 2a and 2b illustrate the effects of direct and reverse curved magnetic fields on the lateral shape of the electron beam at different stations in such a tube in the practice of the present invention;

FIGS. 3 and 4 are cross sectional views of a circular M-type backward wave oscillator incorporating features set forth in this invention;

FIG. 5 is a symbolic representation of a portion of an M-type backward wave oscillator showing the general movement of two types of electrons, type A giving up energy and type B absorbing energy from the RF wave;

FIG. 6 depicts one method of producing both direct and reverse curved magnetic fields at the same station of the interelectrode space.

Turning first to FIGS. 1a and 1b, there is shown a symbolic representation of a typical crossed field traveling wave device, for example, an M-type backward wave oscillator, including an envelope 1 enclosing an elongated sole electrode 2 substantially parallel to a slow wave structure or delay line 3, an electron emitting cathode 4, an accelerating electrode 5 and a collector electrode 6.

In operation, it is desirable to insulate accelerating electrode 5 from the delay line 3 and to electrically couple the delay line to collector electrode 6 while in other applications it may be desirable to electrically insulate electrodes 5, 6 and line 3 applying a different potential to each. However, for purposes of example, assume that delay line 3, collector electrode 6 and envelope 1 are at ground potential while sole electrode 2, cathode 4 and accelerating electrode 5 are each at different negative potentials. This may be accomplished by coupling to battery 9 as shown in FIG. 1a.

Delay line 3 and sole electrode 2 are disposed so that a substantially uniform field is created in the interelectrode space therebetween and the entire device is placed in a uniform DC magnetic field denoted B and represented in FIG. 1a by a circle with a cross in the center, indicating that the direction of the magnetic field is into the page. Consequently, electrons emitted from cathode 4 are accelerated by electrode 5 into the interelectrode space 7 and travel down the length of said space forming a beam and interacting with an RF wave in delay line 3, increasing the RF power flowing in an opposite direction. The RF power flows to an output at one end of space 7 coupled to delay line 3 as shown in the figure. At the other end of interelectrode space 7, collector 6 collects the electron beam. In FIG. 1b there is shown a cross section of the device of FIG. 1a showing the crossed electric and magnetic fields in interelectrode space 7, the electric field being represented by broken lines and the magnetic field being represented by solid lines. The electron beam 8 represented by a circle with a dot at the center indicates that the beam is moving out of the page.

In order that the tube operate efficiently, it is desirable that electrons forming the beam be bunched close to center plane 3a of the delay line, shown in FIG. 2a, where the RF field is maximum. One method of compelling beam electrons to move in the area of the center plane where the RF field is maximum in accordance with features of the present invention, is to provide a curved or bowed magnetic field, as shown by the cross sectional view in FIG. 2a, which represents a sectional view at, for example, station one of FIG. 1a. Similarly, FIG. 2b represents a sectional view at, for example, station two where the magnetic field as bowed towards the sole 2 and, thus, a substantial number of the electrons forming the beam are forced to move in the area of interelectrode space 7 where the RF field is considerably weaker than in the area of the center plane 3a. In order to simplify description, hereafter magnetic field bowing away from the sole, as shown in FIG. 2a, will be referred to as direct bowing and magnetic field bowing towards the sole, as shown in FIG. 2b, will be referred to as reverse bowing.

In progressing from the cathode end to the collector end of space 7, it is preferable that the bowing of the magnetic field gradually change from direct bowing, as shown in FIG. 2a, to reverse bowing, as shown in FIG. 2b, and that the sole end shields denoted 10 and 11 be cut back gradually as the field bowing changes from direct to reverse. Consequently, the electrons forming the beam are compelled to disperse and move away from the area of plane 3a in space 7 where the RF field is high. The effects of the direct and reverse bowing magnetic field on the cross sectional shape of the beam are shown symbolically in FIGS. 2a and 2b, respectively. The general motion of beam electrons in these figures is represented as being into the page.

One effect of the reverse bowing magnetic field shown in FIG. 2b is to prevent electrons from being collected by the delay line 3. Electrons are collected by the delay line when they move to higher and higher equi-potential lines of the electric field E, which occurs when the electrons give up energy to the RF wave in the delay line. Electrons can be prevented from reaching the delay line by removing the electrons from the high RF field area. This is accomplished, as shown in FIG. 2b, where the electron beam is caused to disperse in a lateral manner and a substantial number of the electrons forming the beam are removed from the area of high RF field centered about plane 3a when they approach the delay line.

One method for producing a magnetic field in interelectrode space 7 which changes from direct to reverse bowing in proceeding from one end of the space 7 to the other end, is shown by the structure in FIGS. 3 and 4. FIGS. 3 and 4 show sectional views of a typical nonreentrant crossed field traveling wave tube such as also described in considerable detail in Patent No. 2,890,372, issued June 5, 1959, to E. C. Dench, and entitled "Traveling Wave Amplifiers." Such a tube consists of a ring shaped sole 12 concentric with a slow wave propagating structure or delay line 13 disposed with respect to each other to form a circular interelectrode space 14. Electrons forming a beam 15 proceed from one end of said space to the other end. Electrons forming the beam are emitted from a cathode structure 16 opposite an accelerating electrode 17 and suitable potentials are applied to cathode 16, accelerating electrode 17 and sole 12 by coupling to leads 18, 19 and 20, respectively.

A transverse D.C. magnetic field is set up in interelectrode space 14 by an external magnet 21. Consequently, the electrons emitted from cathode 16 and accelerated towards accelerating electrode 17 are turned from their original radial direction of motion and injected into the interelectrode space 14. The effect of the electric field between the sole 12 and delay line 13 and the magnetic field is to cause the electrons forming the beam to move at a substantially constant velocity through space 14. The velocity is proportional to the ratio of the electric to the magnetic field in space 14. The electrons follow a circular path through space 14 and are collected by collector electrode 22 which may be at as high a potential as delay line 13.

In FIG. 4 there is shown a sectional view through the axis of the traveling wave tube shown in plan section in FIG. 3. The sectional view shown in FIG. 4 is denoted section AA and is taken along the axis about which the sole 12 and the slow wave structure 13 are concentric, as denoted by line AA in FIG. 3. As shown in FIG. 4, cylindrical magnetic pieces 23 and 24 conduct the magnetic lines from cylindrically shaped magnet 21 to opposite sides of the circular interelectrode space 14, as shown. In accordance with one embodiment of the present invention, the transverse magnetic field, thus created in the interelectrode space 14, is direct bowed near the cathode end of said space and is reverse bowed near the collector end of said space. This is accomplished by disposing the identical cylindrical pieces 23 and 24 on an axis which is parallel to the tube axis about which sole 12 and structure 13 are disposed, but which is displaced a distance $c$ therefrom. Consequently, the axis of the magnet structure consisting of magnet 21 and cylindrical pieces 23 and 24 is displaced a distance $c$ from the axis of the circular interelectrode space 14. If the radius of the circular interelectrode space 14 is denoted $a$ and the radius of cylindrical pieces 23 and 24 from the center of said pieces to the axis of the magnet is denoted $b$, then the relationship between distances $a$, $b$ and $c$ is preferably as follows:

$$b^2 = c^2 + a^2$$

It is preferable in such an embodiment of the present invention that the sole end shields, shown in FIG. 4 and denoted 25 and 26, be cut back gradually in moving from cathode 16 to collector 22 by, for example, machining them on a center which is noncoincident with the tube axis. Consequently, the channel-like cross section of the sole at the cathode end of space 14 is deeper than such cross section at the collector end of space 14.

One result of displacing the axis of the magnet from the tube axis as described above with reference to FIGS. 3 and 4, is to create a direct bowing magnetic field at the entrance or cathode end of interelectrode space 14 for compelling the electrons forming the beam at that end to travel in the region of high RF field; thus, insuring efficient tube operation and causing a maximum transfer of D.C. energy from the electron beam to the RF wave propagated in delay line 13. Another result is to produce a reverse bowing magnetic field at the collector end of space 14 so that a substantial number of the electrons forming the beam are compelled to move outside the high RF field, giving up no more energy to the RF field. Consequently, beam electrons at the collector end of space 14 proceed along constant equipotential lines and do not fall onto delay line 13. Since the electrons are prevented in this manner from falling onto delay line 13, it is quite possible to insulate the delay line from the other electrodes in the device and, consequently, the voltage applied thereto can be modulated so as to modulate the output RF frequency.

The electrodes and delay line in the tube are enclosed and sealed within upper and lower plates 27 and 28, respectively, which form vacuum seals with delay line support ring 29. Leads 18, 19 and 20 are brought out through structure 30 to terminals 31, 32 and 33. Structure 30 forms a vacuum seal with upper plate 27, as shown in the figure.

Turning next to FIG. 5 there is shown a symbolic representation of the interelectrode space between the delay line and sole in a typical cross field traveling wave tube, such as the backward wave oscillator shown symbolically in FIG. 1a. A considerable portion of the entering electrons forming the beam are phased such that they extract energy from the RF field near the center plane of the delay line. It is desirable to inhibit the energy extraction process by any possible means. Electrons which properly give up energy to the RF wave move to higher and higher equi-potential lines denoted by broken arrow A and electrons which, undesirably, extract energy from the RF wave move to lower and lower equi-potential lines as denoted by broken arrow B. If the D.C. magnetic field is shaped so that A type electrons always move in a direct bowing magnetic field and B type electrons always move in a reverse bowing magnetic field, then A type electrons will be compelled to move along the center plane of the interelectrode space where the RF field is high and B type electrons will be compelled to move along the outer edge of the interelectrode space where the RF field is low. Furthermore, the B type electrons will drift along until intercepted by the collector electrode or by an auxiliary electrode at cathode potential positioned inside the end shields of the sole. In FIG. 6 there is shown a method for achieving both direct and reverse bowing at substantially all stations along the length of an interelectrode space 34, which may be the interelectrode space 7 of FIGS. 1a and 1b or space 14 of FIGS. 3 and 4. FIG. 6 shows an end view of a typical interelectrode space formed by sole 35, delay line 36 and magnetic pole pieces 37 and 38. The pole pieces shown are very thin and, thus, the magnetic lines running from one piece to the other are direct bowed near the delay line and reverse bowed near the sole. The electron beam 39 is represented as moving into the page and is symbolically represented in cross section to show lateral convergence of the type A beam electrons and lateral divergence of type B beam electrons. Consequently, the type A electrons which give up energy to the RF wave are compelled to move close to plane 34a where the RF field is high and type B electrons which extract energy from the RF wave are compelled to move towards the shields a and b of the sole electrode where they may be collected by suitable means or allowed to drift along equi-potential lines to the collector electrode at one end of space 34.

Because of the necessity of achieving both kinds of bowing, at stations along the interelectrode space, the method shown in FIG. 6 is preferably adapted to tubes having a substantial separation between sole and line and in which the width of the sole and line is narrow. This is the case in, for example, low frequency oscillators.

While there is described above some simple methods for shaping the magnetic field in the interelectrode space of an M-type backward wave oscillator to increase the efficiency of energy extraction from the beam, prevent excessive numbers of electrons from being collected by the oscillator delay line and compel beam electrons to travel either inside or outside the high RF field in the interelectrode space between the delay line and sole of such an oscillator, depending on whether the electrons are giving up or extracting RF energy, it is to be understood that these descriptions are made only by way of example and not to limit the spirit or scope of the present invention as set forth in the following claims.

What is claimed is:

1. An electron discharge device comprising wave propagating means at one potential, conducting means at another potential disposed with respect to said propagating means to form an elongated space having an electric field therein, means for injecting electrons into said space, means for collection of said electrons and means producing a magnetic field in said space generally transverse to said electric field and transverse to the general motion of said electrons and bowed toward said propagating means at one end of said space and bowed away from said propagating means at the other end of said space to compel electrons moving adjacent to said wave propagating means to interact considerably more with the field from said wave than electrons moving adjacent to said conducting means.

2. An electron discharge device comprising wave propagating means at one potential, conducting means at another potential disposed with respect to said propagating means to form an elongated space having an electric field therein, means for injecting electrons into said space, means for collecting said electrons, and means producing a magnetic field in said space generally transverse to said electric field and transverse to the general motion of said electrons and curved in one direction at one end of said space and curved in an opposite direction at the other end of said space to thereby compel electrons at said one end to give up energy to said wave and to prevent electrons at said other end from falling on said propagating means.

References Cited in the file of this patent

UNITED STATES PATENTS

| 2,259,531 | Miller et al. | Oct. 21, 1941 |
| 2,511,407 | Kleen et al. | June 13, 1950 |
| 2,794,935 | Mourier et al. | June 4, 1957 |
| 2,807,743 | Cioffi | Sept. 24, 1957 |
| 2,992,362 | Boyd | July 11, 1961 |

FOREIGN PATENTS

| 991,909 | France | June 27, 1951 |